(12) United States Patent
Komuro et al.

(10) Patent No.: US 6,749,144 B2
(45) Date of Patent: Jun. 15, 2004

(54) WINDING METHOD AND WINDING DEVICE

(75) Inventors: Katsurou Komuro, Saitama (JP); Itaru Igarashi, Saitama (JP)

(73) Assignee: Nittoku Engineering Kabushiki Kaisha, Saitama (JP)

( * ) Notice: Subject to any disclaimer, the term of this patent is extended or adjusted under 35 U.S.C. 154(b) by 0 days.

(21) Appl. No.: 10/375,366

(22) Filed: Feb. 28, 2003

(65) Prior Publication Data

US 2003/0168547 A1 Sep. 11, 2003

(30) Foreign Application Priority Data

Mar. 7, 2002 (JP) ........................................ 2002-061666

(51) Int. Cl.[7] ............................................. H02K 15/085
(52) U.S. Cl. ................. 242/432.5; 242/432.2; 242/432.6; 29/596
(58) Field of Search ........................... 242/432.2, 432.3, 242/432.4, 432.5, 432.6; 29/596

(56) References Cited

U.S. PATENT DOCUMENTS

| | | | | |
|---|---|---|---|---|
| 2,847,170 A | * | 8/1958 | Lill et al. ................. | 242/432.5 |
| 2,949,789 A | * | 8/1960 | Eminger ........................ | 74/23 |
| 3,334,825 A | * | 8/1967 | Friedrich .................. | 242/432.4 |
| 3,381,907 A | * | 5/1968 | Spanton, Jr. et al. .... | 242/432.6 |
| 3,995,785 A | * | 12/1976 | Arick et al. ............. | 242/432.4 |
| 4,053,111 A | * | 10/1977 | Eminger ................... | 242/432.5 |
| 5,586,383 A | * | 12/1996 | Dolgas et al. ................. | 29/596 |
| 5,732,900 A | * | 3/1998 | Burch ...................... | 242/432.5 |
| 5,860,615 A | * | 1/1999 | Burch ...................... | 242/432.5 |
| 6,098,912 A | * | 8/2000 | Noji ........................ | 242/432.5 |
| 6,626,392 B2 | * | 9/2003 | Kajita ..................... | 242/432.6 |
| 6,659,385 B2 | * | 12/2003 | Akita et al. .............. | 242/432.6 |

FOREIGN PATENT DOCUMENTS

| | | |
|---|---|---|
| JP | 2000-245120 | 9/2000 |
| JP | 2000-270524 | 9/2000 |
| JP | 2001-103716 | 4/2001 |

* cited by examiner

Primary Examiner—Emmanuel Marcelo
(74) Attorney, Agent, or Firm—Rabin & Berdo, P.C.

(57) ABSTRACT

A winding device winds a wire (90) onto a core (8) having a plurality of teeth (8b) protruding from a yoke and having slots (8a) formed between each tooth (8b). The winding device winds the wire (90) by causing a nozzle (3) which lets out the wire (90) to perform a relative motion. The winding device is provided with pusher plates (72) which guide the wire (90) into the slots (8a), and inserts the wire (90) into the slots (8a) by causing the pusher plates (72) to move relative to the core (8).

9 Claims, 15 Drawing Sheets

WINDING METHOD AND WINDING DEVICE

FIELD OF THE INVENTION

This invention relates to improvements in a winding method and winding device for winding a wire around the stator core of an electric motor or a generator.

DESCRIPTION OF THE RELATED ART

As conventional winding methods applied to an inner rotor type stator, a direct winding method in which a wire is directly wound onto teeth, and an inserter winding method in which a pre-wound wire is inserted into a slot are known. The following methods described in (a) and (b) are direct winding methods.

(a) A direct winding method in which a wire is wound onto a core by inserting a nozzle which supplies the wire into the interior of each slot.

(b) A direct winding method in which a wire is wound onto a core by moving the nozzle which supplies the wire on the outside of each slot.

The following method described in (c) is an inserter winding method.

(c) An inserter winding method in which a wire is wound in advance onto a rod-shaped member disposed along the inside of teeth, whereupon the wire is inserted into a slot.

Tokkai 2000-270524, published by the Japanese Patent Office in 2000, and Tokkai 2001-103716, published by the Japanese Patent Office in 2001, disclose as a winding device for performing a direct winding method, a winding device comprising a hooker which leads a point on a wire supplied from a nozzle into a slot.

Tokkai 2000-245120, published by the Japanese Patent Office in 2000, discloses an inserter winding method.

SUMMARY OF THE INVENTION

However, although the direct winding methods (a) and (b) are applied to concentrated winding in which wires are wound in concentration onto each tooth, these methods cannot be applied to distributed winding in which wires are wound over a plurality of teeth. If an attempt is made to perform distributed winding using the direct winding methods in (a) and (b), the wire of the initially wound phase over the slot causes an obstruction such that the wire to be wound in the following phases cannot be wound. Even if the wires are inserted into the slots by manual labor, a gap appears between the core and the wire, with the result that the wire space factor (density) in respect of the core cannot be increased.

When distributed winding is performed in the inserter winding method in (c), the space factor of a wire is increased by inserting the wire into the back of a slot. However, the coil end portion of the winding increases in length, leading to an increase in the size of the coil and the necessity for a procedure to shape the coil end portion. Moreover, even if the coil end portion does not affect the torque generated by the motor, when the coil end portion increases in length, the amount of heat generation increases due to copper loss.

An object of this invention is to provide a winding method and winding device in which the wire space factor of the coil portion is raised and the coil end portion is shortened.

In order to achieve above object, this invention provides a winding method for forming coils onto a substantially cylindrical core being provided with a substantially cylindrical yoke, a plurality of teeth which protrude from the yoke in a radial direction and slots formed between adjacent teeth, the winding method comprising the steps of: providing a nozzle for letting out a wire; providing a guide for guiding the wire into a slot; moving the nozzle three-dimensionally relative to the core so as to form a coil; moving the guide relative to the core in the radial direction of the core; and inserting the wire into the slot by the movement of the guide relative to the core.

The winding method may further comprise the steps of: forming a first coil such that two or more teeth are disposed inside the first coil; spacing a coil end portion of the first coil from an axial end face of the teeth; and when a second coil is formed such that at least one common tooth is included within the first coil and within the second coil, inserting a side portion of the second coil, into a space defined by the teeth and the coil end portion of the first coil such that the side portion of the second coil is substantially in contact with a bottom of a slot.

Further, this invention provides a winding device for forming coils onto a substantially cylindrical core being provided with a substantially cylindrical yoke, a plurality of teeth which protrude from the yoke in a radial direction and slots formed between adjacent teeth. The winding device comprises a nozzle for letting out a wire; a nozzle moving mechanism for moving the nozzle three-dimensionally relative to the core in order to form a coil, wherein the wire is wound around two or more teeth by the three-dimensional movement of the nozzle; a guide for guiding the wire into a slot; and a guide moving mechanism for moving the guide relative to the core in the radial direction of the core, wherein the wire is inserted into the slot by the movement of the guide relative to the core.

The details as well as other features and advantages of this invention are set forth in the remainder of the specification and are shown in the accompanying drawings.

PREFERRED EMBODIMENTS OF THE INVENTION

Figure 1:
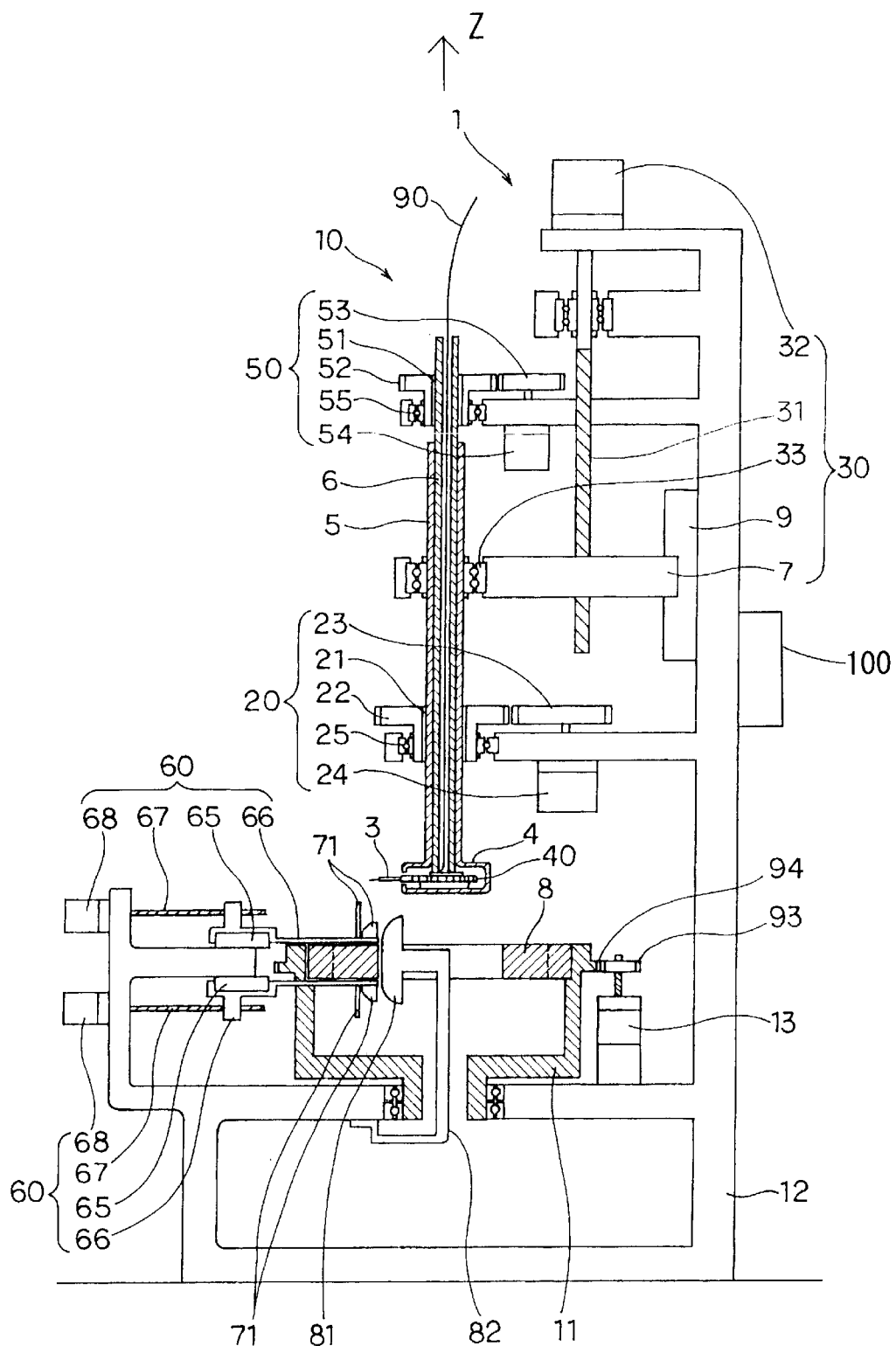
FIG. 1 is a cross section of an inner winding device according to a first embodiment.

Embodiments of this invention will be described below on the basis of the drawings.

In FIGS. 1 through 12, a substantially cylindrical core 8 constitutes the stator of an inner rotor type three phase, four pole motor. The substantially cylindrical core 8 comprises a substantially cylindrical yoke and twenty-four teeth 8a (magnetic poles) which protrude from the yoke in a radial direction and are disposed at equal angles and intervals. Slots 8b are formed between adjacent teeth 8a. Distributed winding, in which the wire 90 is wound over five teeth 8a, is performed to form a stator coil.

Four sets of coils comprising each of the U, V, and W phase coils are formed along the peripheral direction. Each coil is comprised of a coil side portion 92 which is fitted into a slot 8b, a coil end portion 91 which emerges from the slot 8b and extends over five teeth 8a, and a corner portion 103 between the coil side portion 92 and coil end portion 91. Each coil end portion 91 is formed in series along the radial direction, with the U phase coil end portion 91u disposed furthest toward the outside, the V phase coil end portion 91v disposed in an intermediate position, and the W phase coil end portion 91w disposed furthest toward the inside. The U, V, and W coils include at least one common tooth. The U, V, and W phase coil end portions 91u, 91v, 91w hardly overlap because they obstruct one another.

It should be noted that this invention is not limited to the aforementioned motor and may be applied to another motor with a different number of phases and poles. For example, a two phase four pole motor comprises sixteen teeth and slots in the stator and a wire is wound over two teeth.

FIG. 1 illustrates an inner winding device 1 for automatically manufacturing a stator coil. The inner winding device 1 comprises a stator holder 11 for supporting the core 8, and an index motor 13 for rotating the stator holder 11. The stator holder 11 is rotatably supported on a frame 12 via a bearing. The rotation of the index motor 13 is transmitted to the stator holder 11 through a gear 93 and a ring gear 94. Here, the central axis of the stator holder 11 is set as the Z axis, this Z axis forming the central axis of the core 8.

The inner winding device 1 comprises a nozzle 3 for letting out the wire 90 and a nozzle moving mechanism 10 for moving the nozzle 3 three-dimensionally relative to the core 8. This nozzle moving mechanism 10 comprises a head 4 for supporting each nozzle 3, a cylindrical head support shaft 5 for supporting the head 4, a head support shaft rotating mechanism 20 for rotating the head support shaft 5 about the Z axis, and a head support shaft moving mechanism 30 for causing the head support shaft 5 to perform a reciprocating motion in the direction of the Z axis.

The head support shaft rotating mechanism 20 comprises a spline 21 which is cut into the outer periphery of the head support shaft 5, a gear 22 which is slidably engaged with the spline 21, a pinion 23 which meshes with the gear 22, and a head support shaft rotary motor 24 for rotationally driving the pinion 23. The rotation of the head support shaft rotary motor 24 is transmitted to the head support shaft 5, whereby the head 4 rotates. The head support shaft rotary motor 24 is fixed to the frame 12, and the gear 22 is supported by the frame 12 via a bearing 25 to thereby mesh with the pinion 23. As a result, the movable mass including the head 4 can be greatly reduced.

The head support shaft moving mechanism 30 comprises a movable base 7 which supports the head support shaft 5 via a bearing 33 so as to be capable of rotation about the Z axis, a rail 9 for supporting the movable base 7 so as to be capable of movement relative to the frame 12 in the Z axis direction, a ball screw 31 which is screwed to the movable base 7, and a movable base driving motor 32 for rotationally driving the ball screw 31. The movable base driving motor 32 is fixed to the frame 12. When the ball screw 31 is rotated by the movable base driving motor 32, the movable base 7 goes up and down, whereby the head 4 performs a parallel motion in the Z axis direction via the head support shaft 5.

Figure 2:
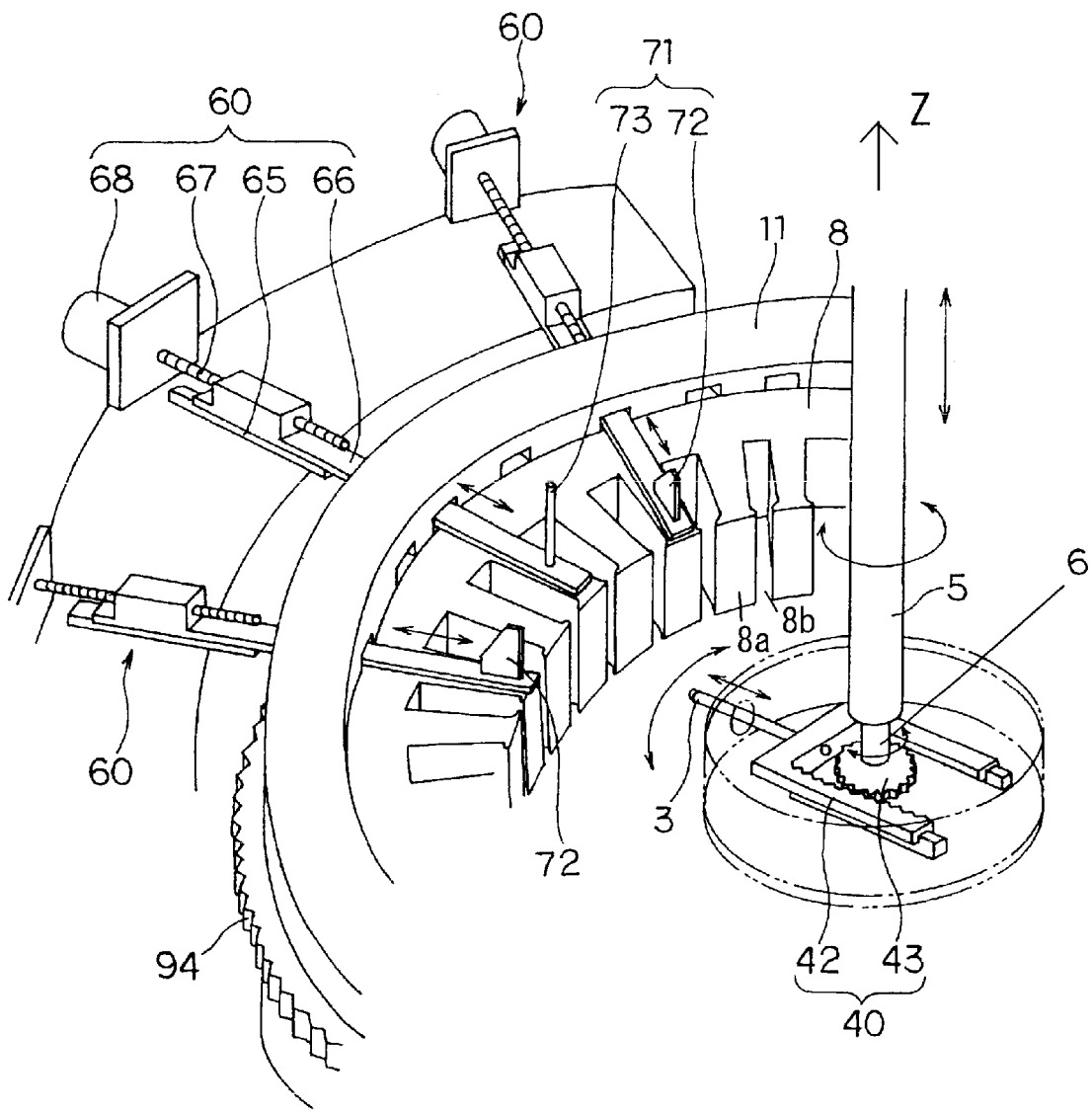
FIG. 2 is a partial perspective view of the inner winding device according to the first embodiment.

The nozzle moving mechanism 10 is further provided with a nozzle radial direction moving mechanism 40 for moving the nozzle 3 in a substantially radial direction to the Z axis, whereby the wire 90 is aligned with the teeth 8a. As shown in FIG. 2, the nozzle radial direction moving mechanism 40 comprises a rack 42 which is capable of moving the nozzle 3 slidably in a substantially radial direction to the Z axis, a pinion 43 which meshes with the rack 42, a cylindrical nozzle moving shaft 6 which passes through the head support shaft 5 to support the pinion 43, and a nozzle moving shaft rotating mechanism 50 for rotationally driving the nozzle moving shaft 6.

When the nozzle moving shaft 6 rotates relative to the head support shaft 5, the pinion 43 rotates relative to the rack 42 so that each nozzle 3 moves in a substantially radial direction to the Z axis. As a result, a nozzle moving shaft rotary motor 54 which causes the pinion 43 to rotate does not have to be supported on the head 4, and thus the movable mass including the head 4 can be greatly reduced.

The nozzle radial direction moving mechanism 40 is not limited to a configuration using the pinion 43, but may employ a link constitution, cam constitution or the like for interlocking the nozzle moving shaft 6 and each nozzle 3.

Further, the number of nozzles 3 provided on a single head 4 is not limited to one, but may be increased to two or three according to specifications such that winding is performed in a plurality of locations simultaneously.

The wire 90 is supplied from a wire supply source, not shown, through a tension device, and is led to the nozzles 3 through the inside of the nozzle moving shaft 6. The wire 90 may be supplied in a bundle of a plurality of wires. In so doing, the wire space factor is increased, thereby improving motor performance.

The nozzle moving shaft rotating mechanism 50 comprises a spline 51 which is cut into the outer periphery of the nozzle moving shaft 6, a gear 52 which is slidably engaged with the spline 51, a pinion 53 which meshes with the gear 52, and a nozzle moving shaft rotary motor 54 for rotationally driving the pinion 53. The rotation of the nozzle moving shaft rotary motor 54 is transmitted to the nozzle moving shaft 6 such that the pinion 43 is rotated. The nozzle moving shaft rotary motor 54 is fixed to the frame 12, and the gear 52 is supported on the frame 12 via a bearing 55 to thereby mesh with the pinion 53.

The inner winding device 1 is provided with a controller 100 for controlling the operations of each servo motor 24, 32, 54. The controller 100 is a microprocessor-based controller that comprises a microprocessor and a memory for storing programs.

The controller 100 is constituted such that when the head 4 is rotated, the head support shaft rotary motor 24 and the nozzle moving shaft rotary motor 54 are caused to rotate in conjunction, thereby causing the head support shaft 5 and nozzle moving shaft 6 to rotate at the same rotational speed (rpm) and in the same direction. When the nozzle 3 is moved in a substantially radial direction, the rotary operation of the head support shaft rotary motor 24 is halted and the nozzle moving shaft rotary motor 54 is caused to rotate alone such that the nozzle moving shaft 6 rotates relative to the head support shaft 5.

The nozzle moving mechanism 10 is configured such that the motors 24, 32, 54 are not attached to the head 4, thus enabling a reduction in the size of the head 4 and increasing the movement speed of the head 4. As a result, the time required for a winding operation can be reduced, and also the head 4 can be used for a small core 8. Moreover, since each motor 24, 32, 54 is fixed to the frame 12, electric wires for transmitting electricity to the motors can be arranged fixedly, thereby eliminating concerns regarding electric wire disconnection.

The inner winding device 1 comprises a guide 71 for guiding the wire 90 to be wound into the slot 8b, and a guide moving mechanism 60 for moving the guide 71 relative to the core 8 in the radial direction thereof. The nozzle 3 is relatively moved such that the wire 90 is hooked around the guide 71, and the guide 71 is relatively moved such that the hooked wire 90 is inserted into the slot 8b.

The guide 71 comprises two pairs of upper and lower pusher plates 72 and a pair of upper and lower pusher pins 73. For every five teeth 8a around which the wire 90 is wound, the pusher plates 72 are disposed in upward and downward protrusion from the axial end faces of the end teeth 8a around which the wire 90 is wound (around which a coil is to be formed), and the pusher pins 73 are disposed in upward and downward protrusion from the axial end face of the central tooth 8a. The end teeth are teeth which contact a coil side portion 92 and which are positioned at circumferential ends of the coil to be formed. The central tooth is a tooth positioned substantially in the center of the coil to be formed.

Three pairs of upper and lower guide moving mechanisms 60 are disposed around the stator holder 11. Each guide moving mechanism 60 comprises a rail 65 which is attached to the frame 12, a slider 66 which is slidably supported by the rail 65, a ball screw 67 which is engaged with the slider 66, and a guide driving motor 68 for rotationally driving the ball screw 67. The guide driving motor 68 is fixed to the frame 12, and when the guide driving motor 68 rotates the ball screw 67, the slider 66 performs a parallel motion in a radial direction to the Z axis. The controller 100 is capable of controlling each of the guide driving motors 68.

The slider 66 is designed to pass through the stator holder 11 and slide along the axial end face of the teeth 8a.

Figure 3A:
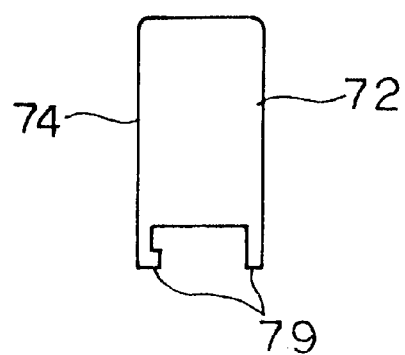
FIGS. 3A–3C is a side view of a pusher plate according to the first embodiment.
Figure 3B:
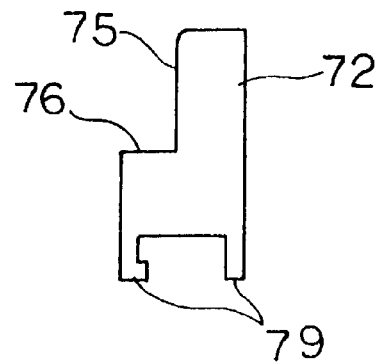
Figure 3C:
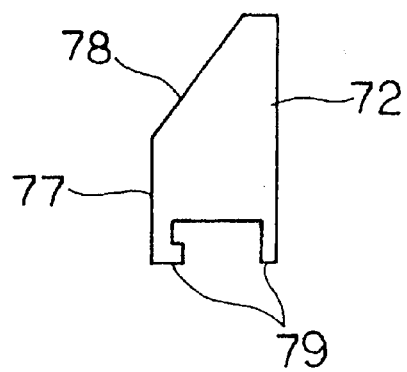

The guide 71 is removably attached to the slider 66. As shown in FIGS. 3A–3C, the pusher plates 72 have a latching claw 79 protruding from the base end thereof, and this latching claw 79 is designed to fit into a hole in the slider 66.

The pusher plate 72 illustrated in FIG. 3A is used in the U phase wire-winding process and is formed as a rectangle having an end face 74 which extends in a perpendicular direction (Z-axis direction). The pusher plate 72 is formed so as to push the U phase coil end portion 91u toward the radially outer side of the slots 8b and teeth 8a by pushing the wound wire 90 using the end face 74.

The pusher plate 72 illustrated in FIG. 3B is used in the V phase wire-winding process and is formed in an L shape having a step portion 76 and an end face 75 which extends in a perpendicular direction from this step portion 76. The pusher plate 72 is formed so as to raise the V phase coil end portion 91v in an axial direction (Z-axis direction) from the axial end face of the teeth 8a by setting the wound wire 90 on the step portion 76 and using the end face 75 to push the wire 90 toward the outside in the radial direction.

The pusher plate 72 illustrated in FIG. 3C is used in the W phase wire-winding process and is formed as a trapezoid having an end face 77 which extends in a perpendicular direction and an inclined portion 78 which extends at an incline from the end face 77. The inclined portion 78 of the pusher plate 72 guides the wound wire 90 such that the wire 90 catches on the end face 77. The end face 77 of the pusher plate 72 pushes the corner portion 103 between the coil side portion and coil end portion as far as possible into a space between the V phase coil end portion 91v and the teeth 8a, whereby the coil side portion 92 of the W phase coil passes through the inside of the V phase coil.

Next, referring to FIGS. 4 through 12, a winding method of the inner winding device 1 will be described. FIGS. 4 through 12 illustrate a procedure for manufacturing a W phase coil, but the procedures for manufacturing U phase and V phase coils are similar to the procedure for manufacturing a W phase coil.

After a user has mounted the core 8 on the stator holder 11, the inner winding device 1 executes the following procedure to successively wind winding. The controller 100 stores a program corresponding to the following procedure and transmits instruction signals in accordance with the program. The motors 13, 24, 32, 54, 68 and a wire clamping device are operable in accordance with the instruction signals from the controller 100.

In a step S1, the wire clamping device holds the tip of the wire 90 which is let out from the nozzle 3.

In a step S2, the guide driving motors 68 rotate so that the sliders 66 pass through the stator holder 11 and coil end portions 91. The end of the slider 66 reaches a position close to the tip of the tooth 8a. The user then attaches the pusher plates 72 and pusher pins 73 to the sliders 66.

In a step S3, the movable base driving motor 32 rotates to lower the head 4 inside the core 8 such that the nozzle 3 moves to a predetermined position in the vicinity of the teeth 8a. The tip of the teeth faces the head 4 disposed inside the core 8.

In a step S4, the nozzle 3 performs a relative motion such that the wire 90 is hooked around the guide 71, and the guide 71 performs a relative motion such that the hooked wire 90 is inserted into the slot 8b. Thus the wire 90 let out from the nozzle 3 is wound once over five teeth 8a.

Here, the inner winding device 1 performs an operation to form a winding by means of the following procedure.

Figure 4:
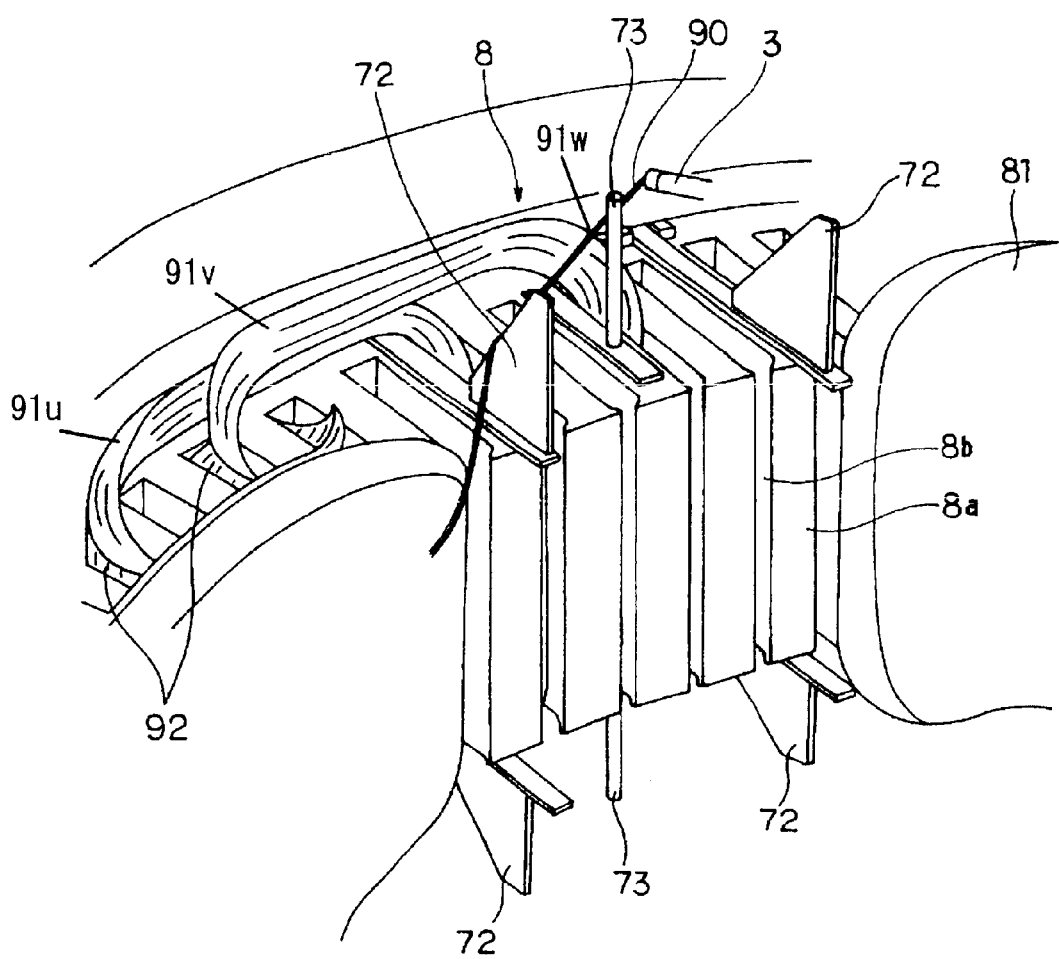
FIG. 4 is a partial perspective view of a core during winding, illustrating one step of a winding method.

In a step S4a, the head 4 rotates and the nozzle 3 begins to move in a peripheral direction along the upper end face of the teeth 8a. Here, the head support shaft rotary motor 24 and nozzle moving shaft rotary motor 54 rotate in conjunction in a single direction, whereby the head support shaft 5 and nozzle moving shaft 6 are caused to rotate at the same rotational speed and in the same direction. Thus the wire 90 catches on one pusher plate 72 and pusher pin 73. At this time, the pusher plate 72 and pusher pin 73 are held in a position close to the tip of the teeth (FIG. 4).

Figure 5:
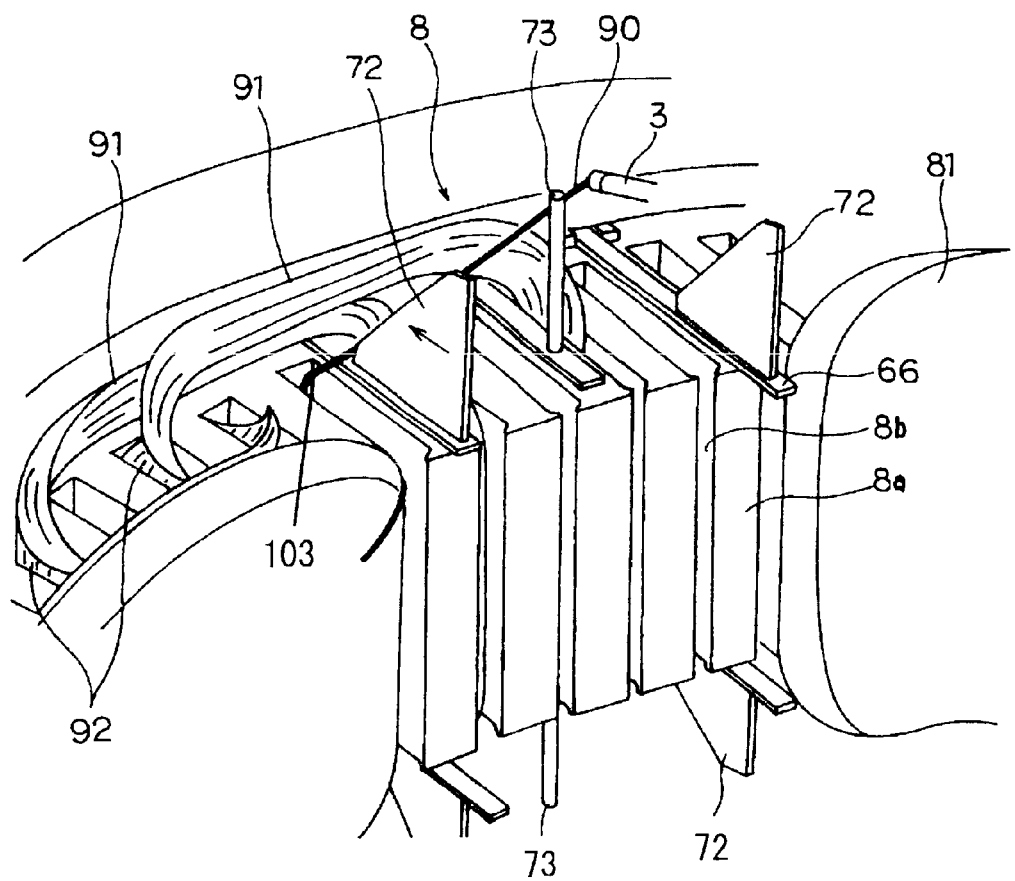
FIG. 5 is a partial perspective view of a core during winding, illustrating one step of a winding method.

In a step S4b, the guide driving motor 68 rotates, whereby one of the upper side pusher plates 72 for guiding the wire 90 moves outward in the radial direction as shown by the arrow in FIG. 5.

Figure 6:
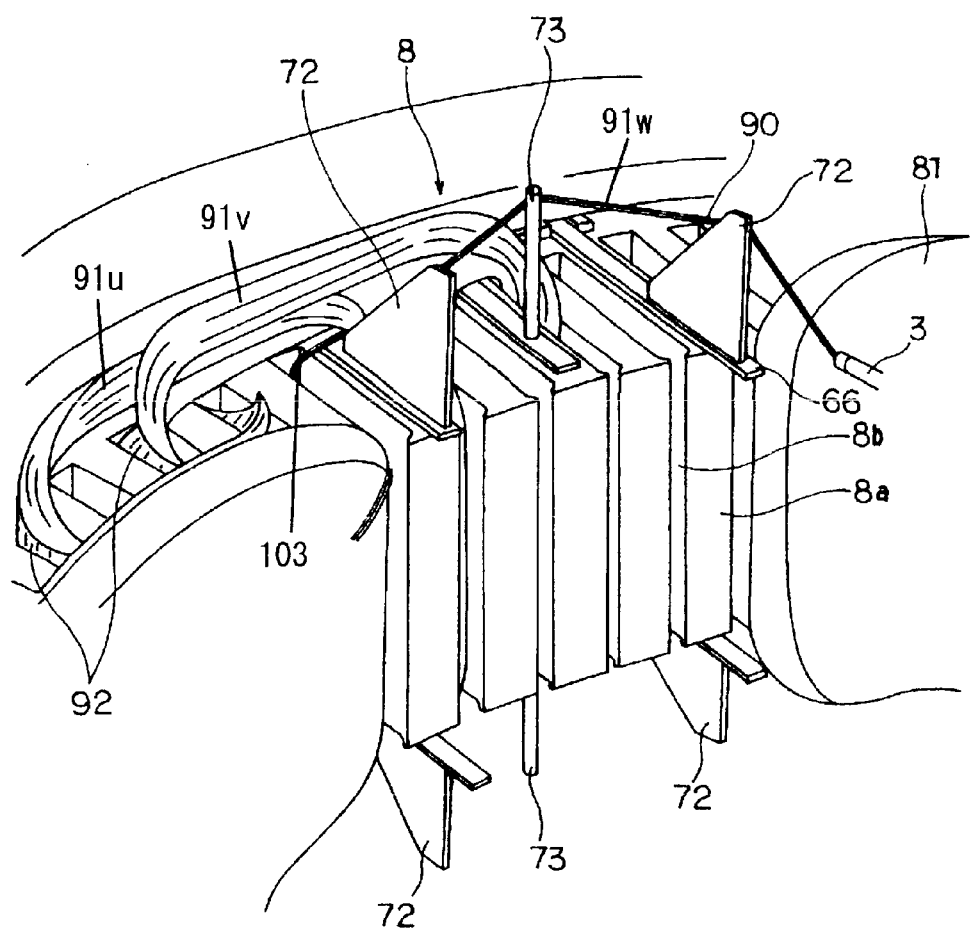
FIG. 6 is a partial perspective view of a core during winding, illustrating one step of a winding method.

In a step S4c, after the wire 90 has caught on the other upper side pusher plate 72, the head support shaft rotary motor 24 and nozzle moving shaft rotary motor 54 stop rotating such that movement of the nozzle 3 in the peripheral direction along the upper end face of the teeth 8a ceases (see FIG. 6).

Figure 7:
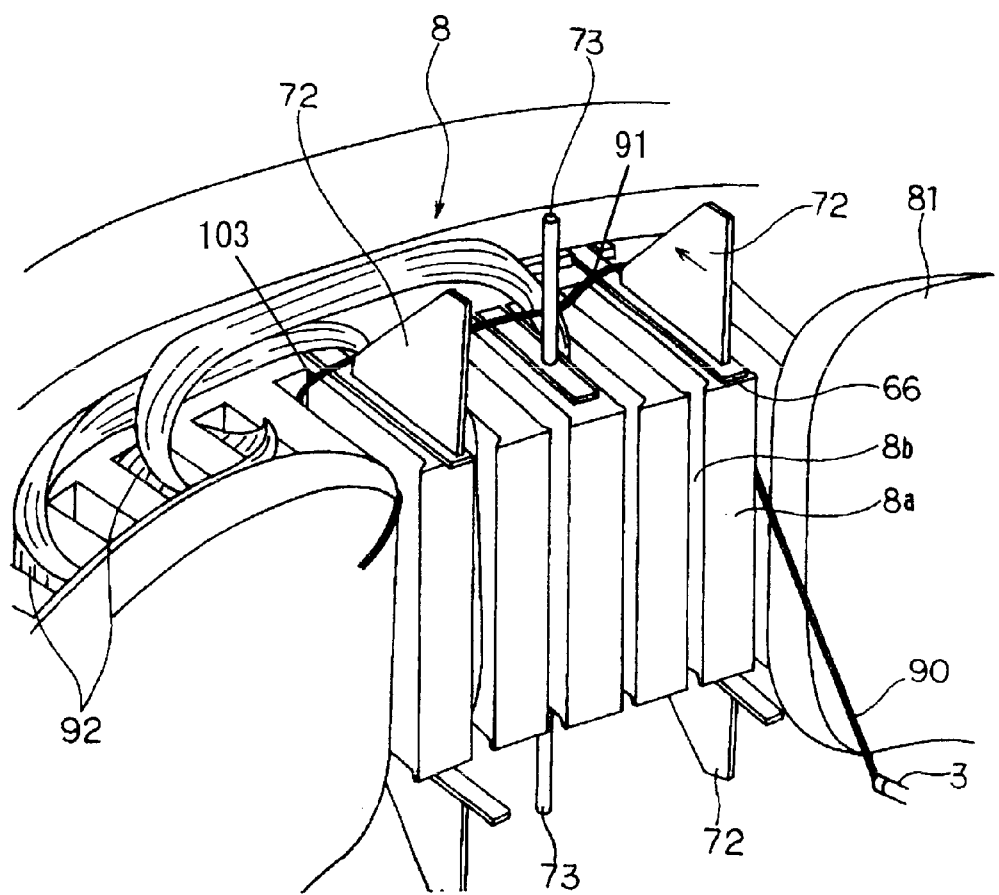
FIG. 7 is a partial perspective view of a core, during winding, illustrating one step of a winding method.

In a step S4d, the movable base driving motor 32 begins rotating to lower the nozzle 3, and the guide driving motor 68 rotates so that the upper pusher plates 72 and upper pusher pin 73 move outward in the radial direction as shown by the arrow in FIG. 7. At this time, the wire 90 is guided by a former 81 to enter the slot 8b (see FIG. 7). The former 81 is disposed to face the tip of the tooth adjacent to the slot into which the wire is guided. Since the former 81 guides the wire 90 let out from the nozzle 3 into the slot 8b, the wire 90 can be wound smoothly.

Figure 8:
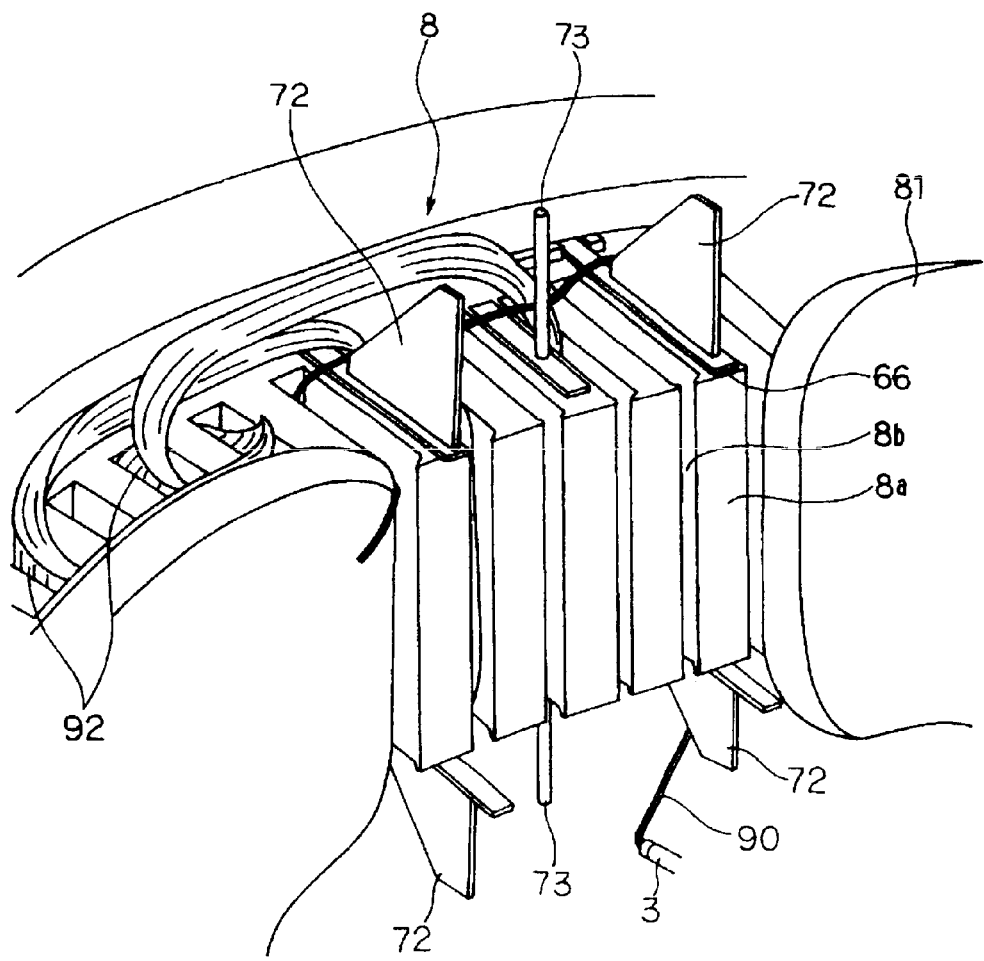
FIG. 8 is a partial perspective view of a core during winding, illustrating one step of a winding method.
Figure 9:
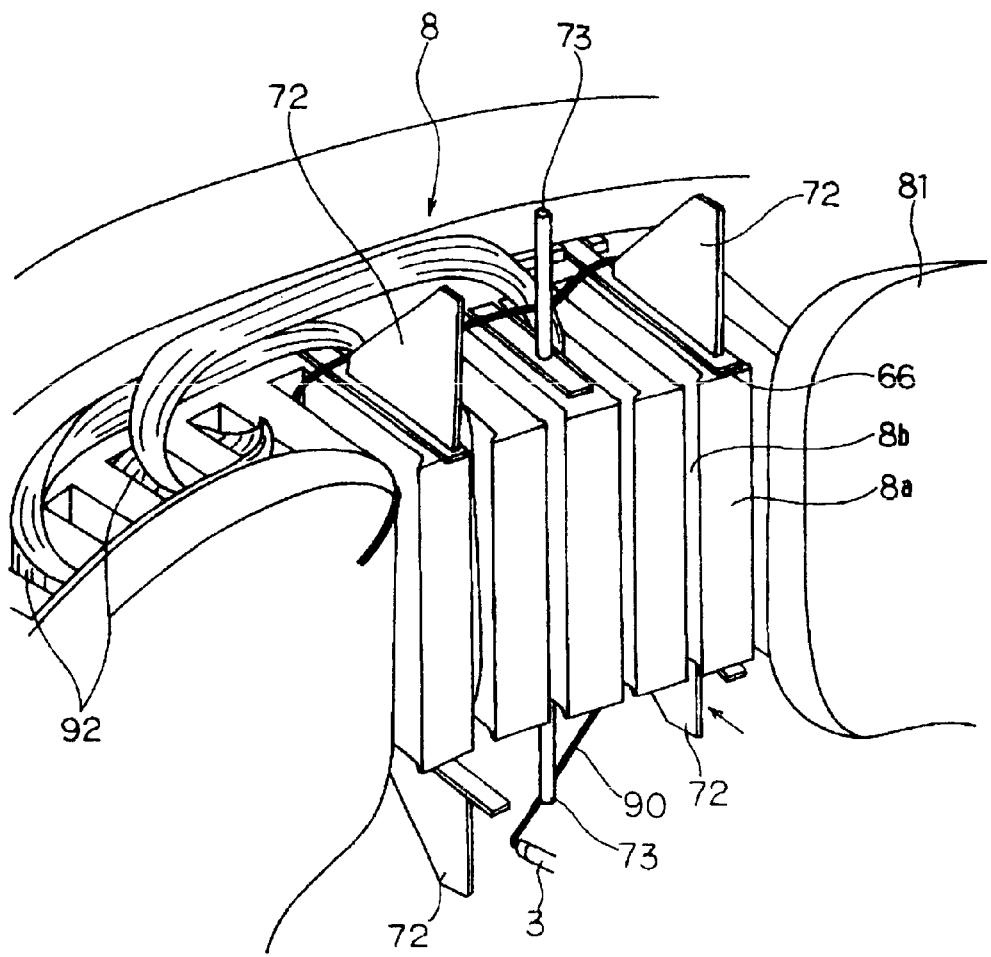
FIG. 9 is a partial perspective view of a core during winding, illustrating one step of a winding method.

In a step S4e, after the wire 90 has passed one of the lower pusher plates 72, the movable base driving motor 32 stops rotating such that the nozzle 3 is stopped from being lowered along the side face of the teeth 8a (see FIG. 8).

In a step S4f, in order to move the nozzle 3 in the peripheral direction along the lower end face of the teeth 8a, the head support shaft rotary motor 24 and nozzle moving shaft rotary motor 54 rotate in conjunction whereby the head support shaft 5 and nozzle moving shaft 6 are caused to rotate at the same rotational speed and in the opposite direction to that in the step S4a. As a result, the wire 90 catches on one of the lower pusher plates 72. The guide driving motor 68 is also rotated such that the pusher plate 72 guiding the wire 90 moves outward in the radial direction as shown by the arrow in FIG. 9.

Figure 10:
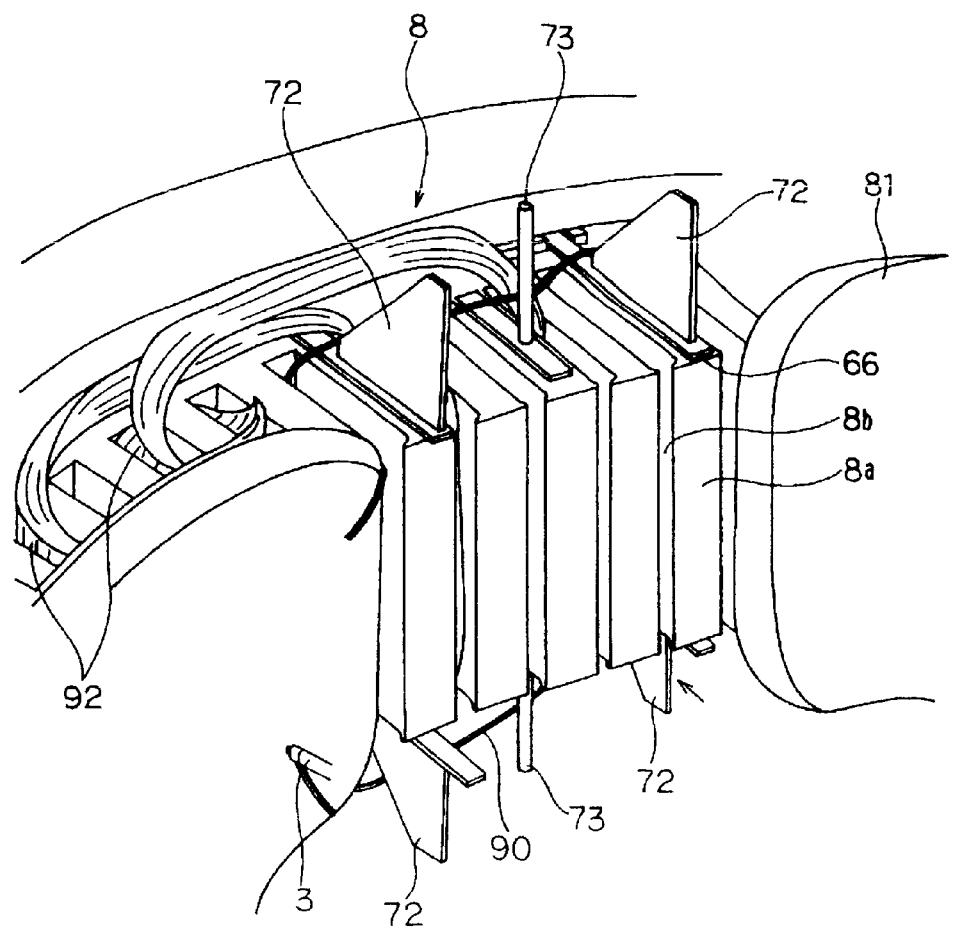
FIG. 10 is a partial perspective view of a core during winding, illustrating one step of a winding method.

In a step S4g, after the wire 90 has caught on the other lower pusher plate 72, the head support shaft rotary motor 24 and nozzle moving shaft rotary motor 54 stop rotating such that movement of the nozzle 3 in the peripheral direction along the lower face of the teeth 8a ceases (see FIG. 10).

Figure 11:
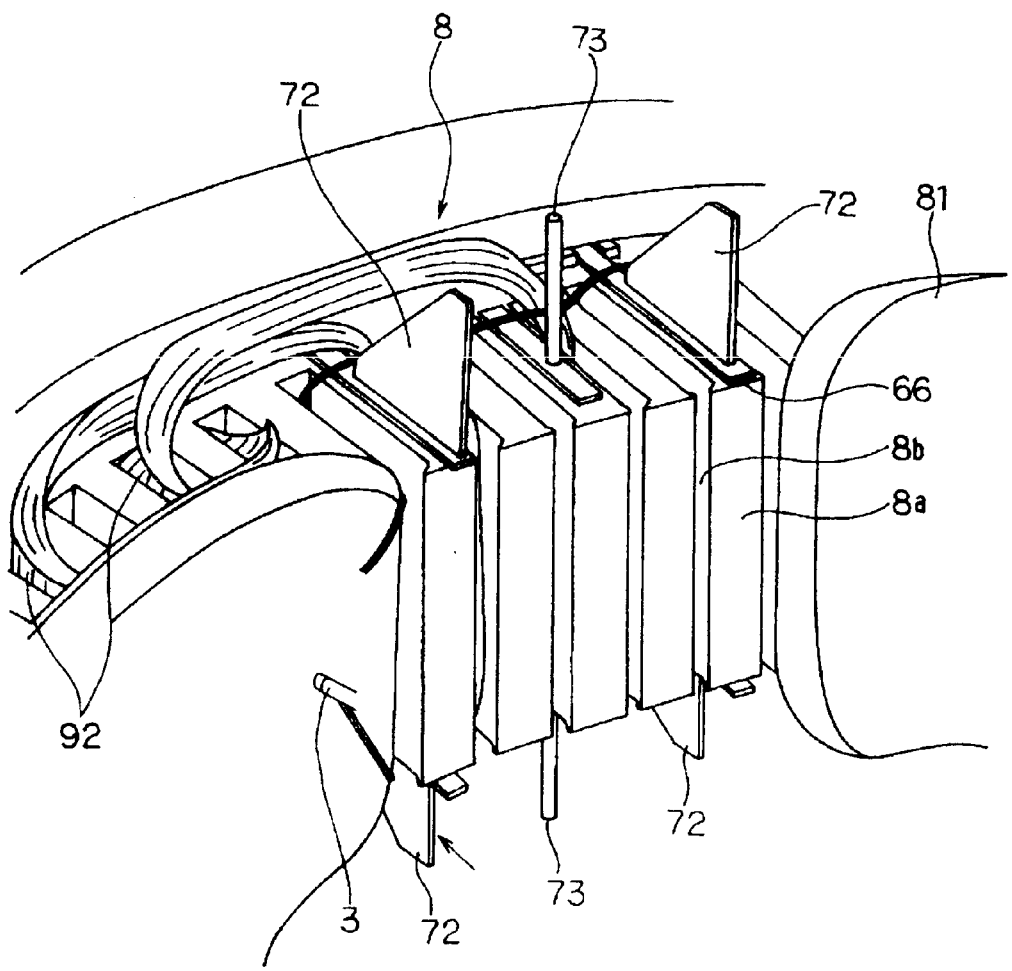
FIG. 11 is a partial perspective view of a core during winding, illustrating one step of a winding method.

In a step S4h, the movable base driving motor 32 begins to rotate in order to raise the nozzle 3, and the guide moving motor 68 rotates again such that the lower pusher plates 72 and pusher pin 73 move outward in the radial direction as shown by the arrow in FIG. 11.

In a step S4i, after the wire 90 has passed one of the upper pusher plates 72, the movable base driving motor 32 stops rotating such that the nozzle 3 is stopped from rising along the side face of the teeth 8a. At this time, all of the pusher plates 72 have completed outward movement in the radial direction.

Figure 12:
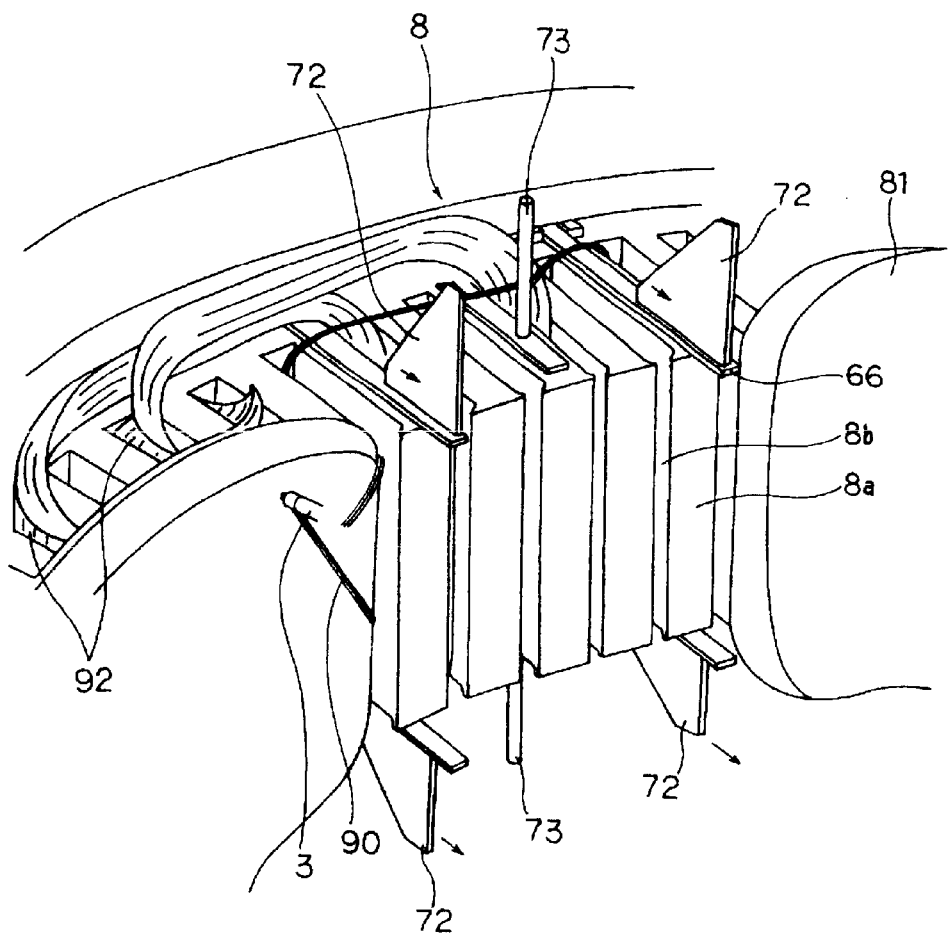
FIG. 12 is a partial perspective view of a core during winding, illustrating one step of a winding method.

In a step S4j, the guide moving motor 68 is rotated to move all of the upper and lower pusher plates 72 and the upper and lower pusher pins 73 inward in the radial direction toward the tip of the teeth (FIG. 12).

By repeating the operations in the steps S4a to S4j, the wire 90 is wound in rows to form a coil with a predetermined width and a predetermined number of layers.

In a step S5, after the user has removed the pusher plates 72 and pusher pins 73 from the sliders 66, the guide driving motors 68 are rotated to extract the sliders 66 from the stator holder 11.

Once this procedure is complete, the index motor 13 rotates the core 8 by a predetermined angle to move the core 8 to the next winding position. The sliders 66 are then re-inserted into the stator holder 11, the pusher plates 72 and pusher pins 73 are attached, and a similar procedure is repeated.

When winding of all of the teeth 8a is complete, the movable base driving motor 32 raises the head 4 out of the core 8. Since a point on the wire 90 is held by the wire clamping device, not shown, a cutter device, not shown, severs the wire 90 between the teeth 8a and the wire clamping device. The user then removes the core 8 from the stator holder 11.

As noted above, the slider 66 which has a plate-like form is inserted in advance between the core 8 and the U phase coil end portion 91u and between the core 8 and V phase coil end portion 91v so that the guide 71 can be moved along the axial end face of the core 8. The U phase and V phase coils are wound prior to the winding of the W phase coil. Hence the W phase coil end portion 91w is formed near the axial end face of the core 8, as a result of which the length of the coil end portion 91 can be reduced.

When the four pusher plates 72 push each coil end portion 91, the coil side portions 92 are pushed to the bottom of the slots and the coil end portions 91 are disposed in a desired position. In this case, the corner portion 103 and coil side portion 92 of the W phase coil is inserted into a space defined by the teeth and the pre-wound V phase coil end portion 91v.

When the two pusher pins 73 push the center of each coil end portion 91, the coil end portions 91 of each phase are lined up and compressed.

When the U phase winding is wound, the end face 74 of the pusher plate 72 pushes the wire 90 and the pusher pin 73 pushes the wire 90, and as a result, the U phase coil end portion 91 is formed in a position on the radially outer side of the slots 8b and teeth 8a. Pushing radially outwardly the wire 90 on the axial end face of the core 8 allows the coil side portion 92 of the U phase coil to be substantially in contact with the bottom of the slot 8b.

Thus when the V phase winding is wound, the pusher plate 72 may be moved near the rear portion of the slot 8b, thereby reducing the gap which forms between the coil side portion 92 and the bottom of the slot 8b and increasing the space factor. Pushing radially outwardly the wire 90 on the axial end face of the core 8 allows the coil side portion 92 of the V phase coil to be substantially in contact with the bottom of the slot 8b.

When the V phase winding is wound, the wire 90 is set on the step portion 76 of the pusher plate 72 and pushed by the end face 75 of the pusher plate 72. The wire 90 is also pushed by the pusher pin 73. Thus the V phase coil end portion 91 is raised from the axial end face of the teeth 8a in an axial direction.

Thus when the W phase winding is wound, the pusher plate 72 can be moved near the rear portion of the slot 8b, thereby reducing the gap which forms between the coil side portion 92 and the bottom of the slot 8b and increasing the space factor. Pushing radially outwardly the wire 90 on the axial end face of the core 8 allows the coil side portion 92 of the W phase coil to be substantially in contact with the bottom of the slot 8b.

By winding the wire 90 while pushing the wire 90 into the slots 8b using the pusher plates 72 in this manner, the gap formed between the coil side portion 92 and the bottom of the slots 8b is reduced, thereby increasing the space factor in comparison with a conventional direct winding method in which wires are directly wound onto teeth.

The U phase coil end portion 91u is disposed furthest outside in the radial direction of the slots 8b, and the V phase coil end portion 91v is disposed so as to be raised from the axial end face of the teeth 8a. A part of the W phase coil end portion 91w is inserted between the V phase coil end portion 91v and the teeth 8a. Thus, compared to a conventional inserter winding method, the length of the wire 90 constituting the coil end portions 91 can be reduced, thereby reducing the size of the coil. Coil resistance is also reduced, thereby improving motor performance.

The W phase coil end portion 19w is shorter than the U phase and V phase coil end portions 91u, 91v. It should be noted, however, that an equal amount of wire 90 is used for the coil side portions 92 inside the slots 8b, and hence, by performing control such that the current in each phase is equalized, a uniform torque is generated in each phase.

Furthermore, compared to a conventional inserter winding method, the man-hours required for forming the coil end portion following winding can be greatly reduced, thereby increasing productivity.

Furthermore, the size and cost of the winding device can be reduced in comparison with a conventional inserter winding method.

Figure 14:
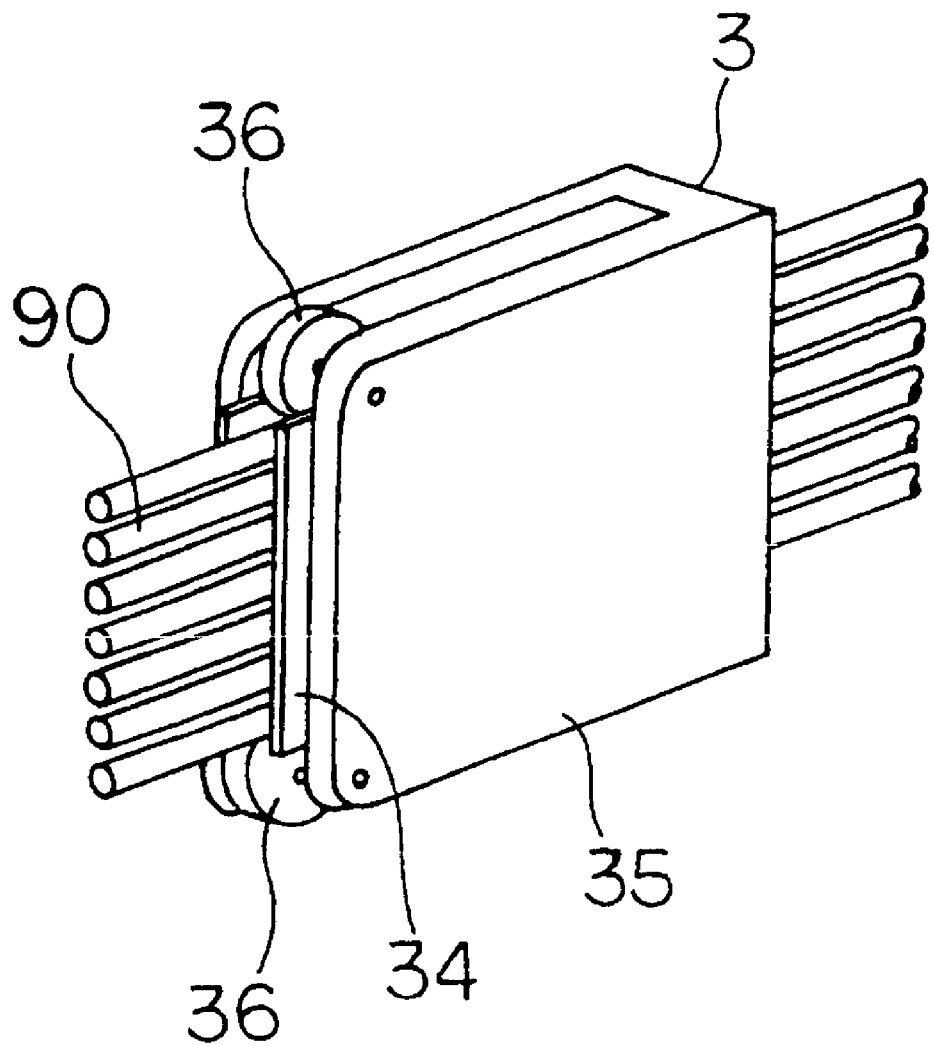
FIG. 14 is a perspective view of a nozzle according to the second embodiment.
Figure 15:
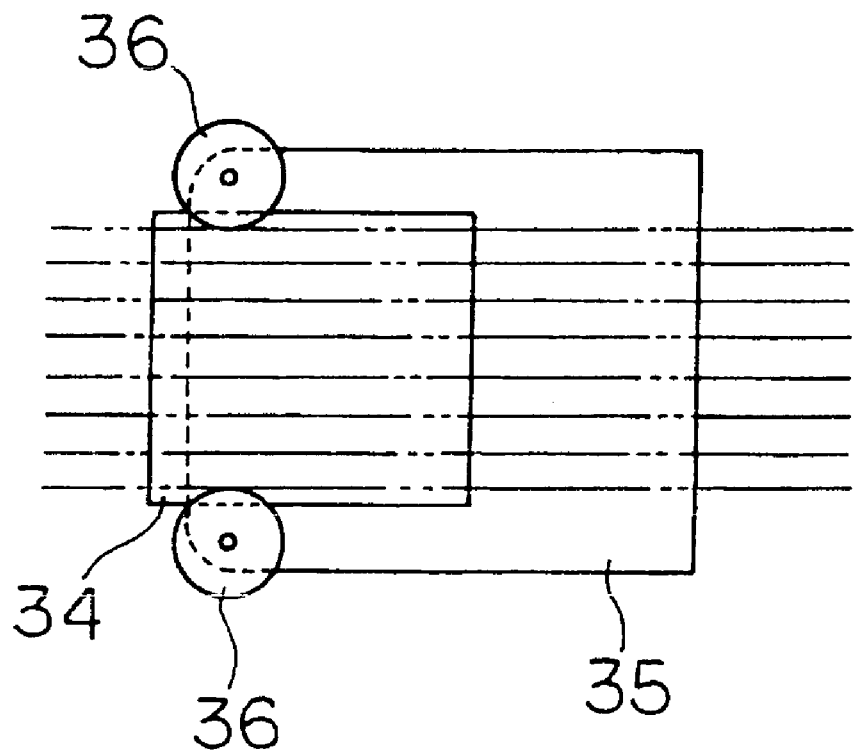
FIG. 15 is a side view of the nozzle according to the second embodiment.

A second embodiment illustrated in FIGS. 13 to 15 will now be described. Note that identical components to the first embodiment are allocated identical reference numerals. The first and second embodiments are identical except for the nozzle 3 and the former 81.

The nozzle 3 is provided with two control plates 34 for letting out a plurality of wires 90 aligned lengthways. The control plates 34 are inserted into a slot 8b, whereby the wires 90 are wound around the teeth 8a.

The nozzle 3 comprises a square frame-shaped main body 35 through which the plurality of wires 90 pass lengthways and in alignment, and the control plates 34 are fixed in parallel inside this main body 35 so as to sandwich the wires 90.

A pair of rollers 36 is attached to the upper and lower portions of the main body 35. By rotating against the upper and lower end wires 90 respectively, the rollers 36 allow each wire 90 to be let out from the nozzle 3 smoothly.

Further the rollers 36 are disposed near the upper and lower end portions of the control plates 34 and guide the wires 90 such that the wires 90 are let out smoothly.

Figure 13:
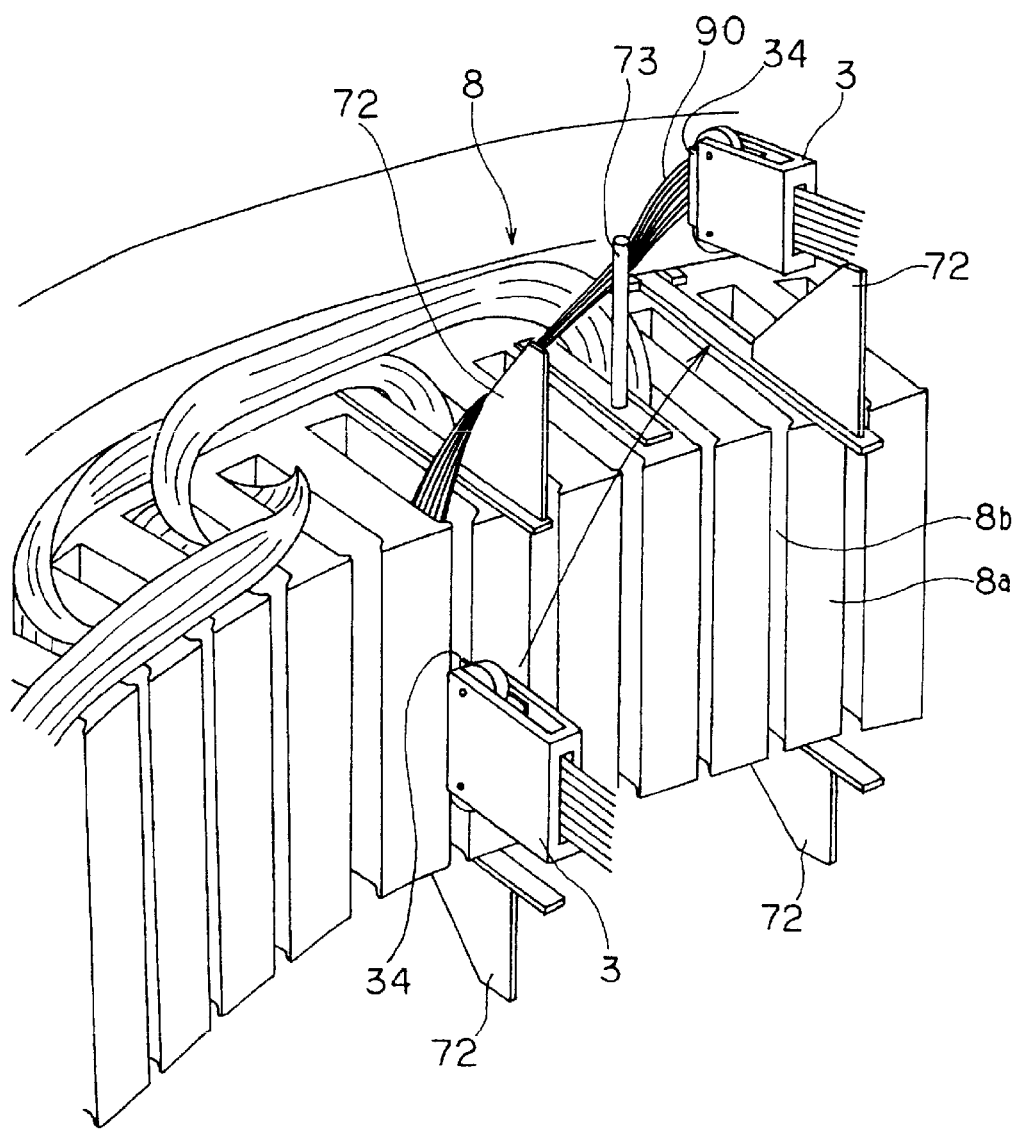
FIG. 13 is a partial perspective view of an inner winding device according to a second embodiment.

As shown in FIG. 13, by winding the wires 90 onto the teeth 8a with the control plates 34 of the nozzle 3 inserted into the slot 8b, the former 81 for guiding the wire 90 into the slot 8b becomes unnecessary. In this case, the wire 90 can be easily inserted even if the inlet of the slot 8b is narrow. The plurality of wires 90 forms a bundle and is wound smoothly around the teeth 8a and the pusher plates 72. As a result, the wires 90 are prevented from twisting together due to friction, and the winding space factor is increased to thereby improve motor performance.

The entire contents of Japanese Patent Application P2002-61666 (filed Mar. 7, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A winding method for forming coils onto a substantially cylindrical core being provided with a substantially cylindrical yoke, a plurality of teeth which protrude from the yoke in a radial direction and slots formed between adjacent teeth, the winding method comprising the steps of:

providing a nozzle for letting out a wire;

providing a guide for guiding the wire into a slot;

moving the nozzle three-dimensionally relative to the core so as to form a coil;

moving the guide relative to the core in the radial direction of the core; and inserting the wire into the slot by the movement of the guide relative to the core.

2. The winding method as defined in claim 1, further comprising the steps of:

forming a first coil such that two or more teeth are disposed inside the first coil;

spacing a coil end portion of the first coil from an axial end face of the teeth; and when a second coil is formed such that at least one common tooth is included within the first coil and within the second coil, inserting a side portion of the second coil, into a space defined by the teeth and the coil end portion, of the first coil such that the side portion of the second coil is substantially in contact with a bottom of a slot.

3. A winding device for forming coils onto a substantially cylindrical core being provided with a substantially cylindrical yoke, a plurality of teeth which protrude from the yoke in a radial direction and slots formed between adjacent teeth, the winding device comprising:

a nozzle for letting out a wire;

a nozzle moving mechanism for moving the nozzle three-dimensionally relative to the core in order to form a coil, wherein the wire is wound around two or more teeth by the three-dimensional movement of the nozzle;

a guide for guiding the wire into a slot; and a guide moving mechanism for moving the guide relative to the core in the radial direction of the core, wherein the wire is inserted into the slot by the movement of the guide relative to the core.

4. The winding device as defined in claim 3, wherein the guide moving mechanism comprises a slider which is movable in a radial direction along an axial end face of the core, and the guide is removably attached to the slider.

5. The winding device as defined in claim 3, wherein the guide moving mechanism comprises a slider which moves in a radial direction along an axial end face of the teeth, and the slider is disposed so as to pass between the axial end face of the core and a coil end portion which covers the axial end face of the core.

6. The winding device as defined in claim 3, wherein the guide comprises two pairs of pusher plates for the coil, wherein pusher plates constituting a pair face each other in an axial direction, each pusher plate being disposed on an axial end face of a tooth positioned at a circumferential end of the coil to be formed.

7. The winding device as defined in claim 3, wherein the guide comprises a pair of pusher pins which face each other in an axial direction, each pusher pin being disposed on an axial end of a tooth positioned substantially in a center of the coil to be formed.

8. The winding device as defined in claim 3, further comprising a former for guiding the wire into the slot, the former is disposed to face a tip of a tooth adjacent to the slot into which the wire is guided.

9. The winding device as defined in claim 3, wherein the nozzle comprises a control plate for letting out a plurality of wires in lengthways alignment, the control plate being inserted into the slot such that the plurality of wires are wound onto the teeth.

* * * * *